United States Patent [19]

Horie et al.

[11] 4,268,397

[45] May 19, 1981

[54] METHOD OF TREATING WASTE WATER

[75] Inventors: Toshio Horie, Yokohama; Shouji Tomioka; Nobuyoshi Mine, both of Kitakyushu, all of Japan

[73] Assignee: The Furukawa Electric Co., Ltd., Tokyo, Japan

[21] Appl. No.: 61,263

[22] Filed: Jul. 27, 1979

[30] Foreign Application Priority Data

Jul. 29, 1978 [JP] Japan .................................. 53-92063
Apr. 6, 1979 [JP] Japan .................................. 54-41057

[51] Int. Cl.³ .............................................. C02F 1/72
[52] U.S. Cl. .................................. 210/746; 210/759; 210/903
[58] Field of Search ............... 210/50, 63 R, DIG. 28, 210/96.1, 59, 60, 61

[56] References Cited

U.S. PATENT DOCUMENTS 3,826,741 7/1974 Nakamura ............................ 210/50

FOREIGN PATENT DOCUMENTS 51-88863 8/1976 Japan .................................... 210/50

Primary Examiner—Benoît Castel
Attorney, Agent, or Firm—Frishauf, Holtz, Goodman and Woodward

[57] ABSTRACT

A waste water-treating method, which comprises the steps of: adjusting the pH value of an aqueous solution containing a nitrous acid radical within a range of 2 to 5; treating said aqueous solution with hydrogen peroxide to oxidize the nitrous acid radical into a nitric acid radical; and throwing away the waste water in the neutralized form.

5 Claims, 3 Drawing Figures

METHOD OF TREATING WASTE WATER

BACKGROUND OF THE INVENTION

This invention relates to a method of oxidizing a nitrous acid radical ($NO_2^-$) contained in an aqueous solution, particularly plant waste water with hydrogen peroxide to convert said nitrous acid radical into a nitric acid radical ($NO_3^-$).

The method of this invention can be effectively applied in treating plant waste water chiefly containing a nitrous acid radical. The reason for this is that a nitrous acid radical contained in a plant waste water acts to increase the value of chemical oxygen demand (hereinafter referred to as "COD") of said waste water, and the nitrous acid has to be properly treated. As used herein, the term "COD value" is defined to mean an amount of oxygen (expressed in ppm) equivalent to that of potassium permangate required to oxidize plant waste water.

The nitrous acid radical is contained in waste water discharged from the plants of organic nitration and nitric acid oxidation and nitrogen oxide-absorbing plants. A high temperature heating medium composed of a molten salt mixture of nitrate and nitrite is widely applied in the fields of, for example, the heat treatment of metals, the processing of soft polyvinyl chloride and the vulcanization of rubber products. Where, for example, a metal material is treated in direct contact with the molten salt mixture, then it is necessary to wash the treated material with clear water. In this case, however, a small amount of nitrite is unavoidably carried into the waste water, after washing.

The various methods available to treat a nitrous acid radical contained in the waste water discharged from the above-mentioned plants are essentially based on the oxidization of said nitrous acid radical into a nitric acid radical which does not increase the COD value of the waste water. One of the proposed methods is to carry out said oxidation by oxides of heavy metals. However, this method is liable to give rise to another environmental pollution. Another proposed method is based on photo-oxidation. However, this method has too low an efficiency to be put to practical application. The present inventors have made studies over a broad range to develop a clean method of oxidizing the nitrous acid radical which can be effectively applied on an industrial basis and is not accompanied with any environmental pollution problem after said oxidation. As a result, the inventors have found that where the nitrous acid radical is oxidized by hydrogen peroxide under a certain specified condition, the reaction of said oxidation is fully completed. For application of this finding to the waste water treatment, the inventors has developed an industrial method of automatically oxidizing the nitrous acid radical contained in said waste water into the nitric acid radical which does not increase the COD value thereof.

DETAILED DESCRIPTION

Figure 1:
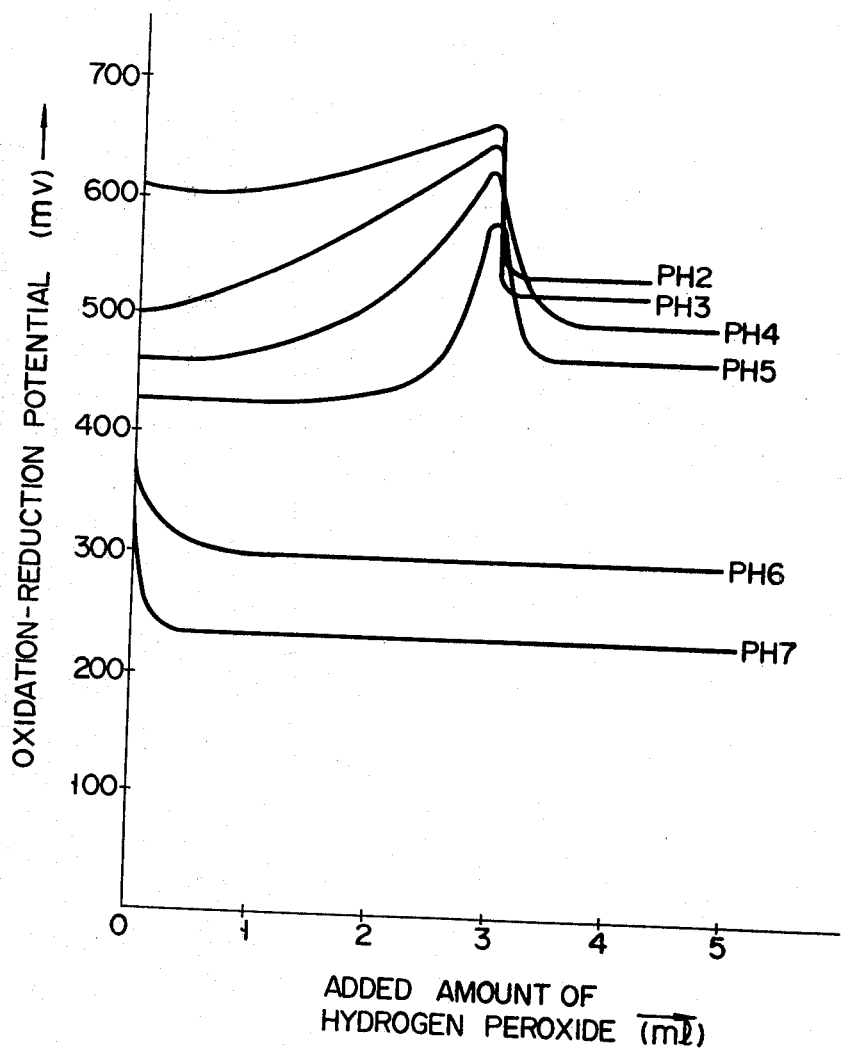
FIG. 1 is a curve diagram indicating the relationship between an amount of a hydrogen peroxide solution added to aqueous solutions containing a nitrous acid radical whose pH has been adjusted to various levels and the levels of the oxidation-reduction potential.

The method of this invention for oxidizing a nitrous acid radical is based in principle on the following reaction formula (1):

$$NO_2^- + H_2O_2 \rightarrow NO_3^- + H_2O \qquad (1)$$

The inventors have studied the favorable conditions for effecting the above-mentioned reaction. As a result, it has been found that the reaction prominently varies with the pH value of the aqueous solutions containing a nitrous acid radical. Chemical analysis of the progress of oxidation of said nitrous acid radical carried out with the pH value of the aqueous solutions varied to different levels indicates that where the pH value increases over a level of 6, the oxidation of said nitrous acid radical proceeds slowly. Where the aqueous solutions are very much reduced in the pH value to be highly acidified, then there arises the following reaction (2) in addition to the aforesaid reaction (1):

$$2NO_2^- + 2H^+ \rightarrow N_2O_3 + H_2O$$

$$N_2O_3 \rightleftharpoons NO + NO_2 \qquad (2)$$

As a result, a harmful $NO_2$ gas is released into the atmosphere, failing to fully attain the intended object of treating the nitrous acid radical. However, the evolution of said $NO_2$ gas can be suppressed by controlling the pH value of an aqueous solution containing a nitrous acid radical (hereinafter referred to as "an aqueous solution being treated"). It is necessary to adjust the pH value of an aqueous solution being treated to a higher level than 2 in order to minimize the evolution of $NO_2$ gas during the oxidation of the nitrous acid radical by hydrogen peroxide to such a level as raises no practical problems. It is therefore advised to oxidize the nitrous acid radical of an aqueous solution being treated with the pH value controlled to a level of 2 to 5, or more preferably to a level of 3 to 4.

An inorganic acid such as sulfuric acid or hydrochloric acid can be used to adjust the pH value of an aqueous solution being treated within a range of 2 to 5. After the nitrous acid radical is oxidized by hydrogen peroxide, it is necessary to discharge the treated waste water with the pH value thereof adjusted to 7 by neutralization with alkali. In this case, inorganic alkali such as sodium hydroxide or sodium carbonate is used.

Where the treating method of this invention is applied, it is necessary to apply hydrogen peroxide in an amount sufficient but not excessive for oxidation of all the nitrous acid radicals contained in an aqueous solution being treated into a nitric acid radical. The reason for this is that if hydrogen peroxide is applied in excess, the hydrogen peroxide itself conversely increases the COD value of said aqueous solution. For application of a proper amount of hydrogen peroxide, it is necessary to carry out in advance the quantitative analysis by potassium permanganate of an aqueous solution being treated in order to determine an amount of hydrogen peroxide to be used and, after oxidation of the nitrous acid radical too, examine the residue of the nitrous acid radical by the same quantitative analysis. Further, as need arises, the COD value of an aqueous solution thus treated has to be minutely controlled to minimize the COD value.

Since the above-mentioned operation involves complicated processes, the inventors have studied to develop an instrument allowing for the continuous measurement of necessary data. As a result, it has been found that the oxidation-reduction potentiometer is adapted to attain this object.

FIG. 1 shows changes in the oxidation-reduction potential of an aqueous solution being treated whose pH value has been set at various levels, when hydrogen peroxide is added to said aqueous solution. The oxidation-reduction potentiometer used was the type whose reference electrode was made of silver chloride and whose metal electrode was formed of platinum. Hydrogen peroxide aqueous solution with a concentration of 5.8 mol/l was added to 63 ml of a solution of sodium nitrite having a concentration of 0.165 mol/l. Where an aqueous solution being treated had a higher pH value than 6, the reaction of the formula (1) did not take place. First addition of a small amount of hydrogen peroxide caused only a slight change in the potential of the aqueous solution. Succeding addition of hydrogen peroxide kept the potential still at the same level. Where, however, hydrogen peroxide was added to the aqueous solution with pH set at a lower level than 5, then the potential of said aqueous solution rose higher, as hydrogen peroxide was added, and sharply dropped when reaction between the nitrous acid radical of the aqueous solution and hydrogen peroxide was completed, thereby indicating a distinct end point of reaction. In the above-mentioned test, with a pH lower than 5, reaction between the nitrous acid radical of the aqueous solution and hydrogen peroxide showed a distinct end point, though the potential of acid aqueous solutions varied with the initial pH value thereof. During the reaction, changes in the potential of the aqueous solutions were affected by ions present in said solutions. In all cases, however, the potential of the aqueous solutions indicated a sharp drop when the reaction was brought to an end. Changes in the potential at the end of the reaction are affected by the type of the metal electrode used. It is preferred to apply such a metal electrode as platinum or platinum black in the surface of which the reaction proceeds very quickly.

Figure 2:
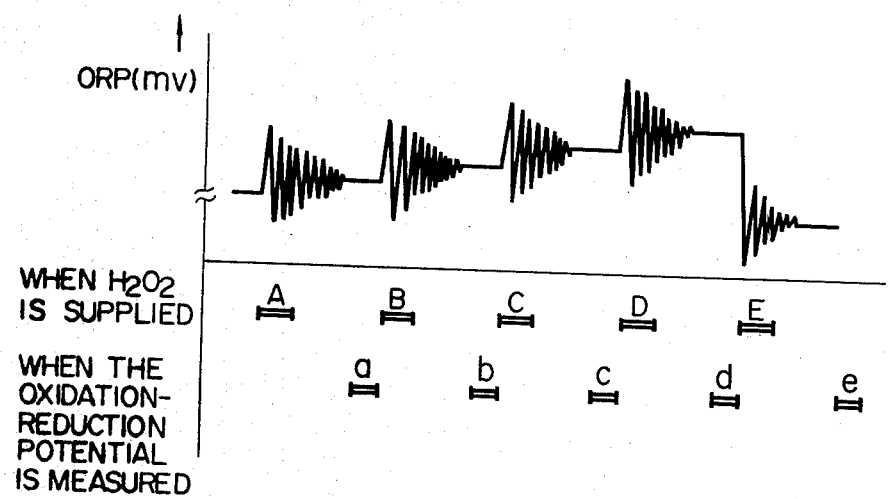
FIG. 2 illustrates changes in the oxidation-reduction potential (ORP) resulting from the intermittent introduction of hydrogen peroxide as applied in this invention.

Based on the above-mentioned facts, the inventors have studied a method of automatically treating plant waste water containing a nitrous acid radical, and developed a new automatic system for said treatment.

Where plant waste water containing a nitrous acid radical is oxidized on an industrial scale in accordance with the method of this invention, then the plant waste water is put in a large tank with a stirrer, followed by the adjustment of the pH value of said waste water. A small amount of hydrogen peroxide is added to said waste water intermittently at a predetermined time interval. FIG. 2 shows changes in the potential of an aqueous solution containing a nitrous acid radical such as plant waste water when hydrogen peroxide was added thereto. During the periods A, B, C, D, E immediately after addition of hydrogen peroxide, the potential of the aqueous solution noticeably fluctuated. At points of time, a, b, c, d, e, a certain length of time after addition of hydrogen peroxide, the aqueous solution showed a stable potential. A length of time required for the fluctuation of the potential occurring after addition of hydrogen peroxide to disappear can be experimentally determined in advance with ease, though said time varies with, for example, the amount of the aqueous solution which is held in a tank.

The potentials of the aqueous solution at points of time a, b, c, d, progressively increase, and decrease at the end point e of reaction between the nitrous acid radical of the aqueous solution and hydrogen peroxide. At this point of time, addition of hydrogen peroxide is stopped. However, it is difficult to trace the shifting of the pointer of an oxidation-reduction potentiometer by the eye and determine the end point of the reaction. Therefore, the inventors have developed an automatic waste water-treating method which is designed to utilize an electric signal coming from the oxidation-reduction potentiometer and stop the supply of hydrogen peroxide at the end point of the reaction.

There will now be described the sequential steps of the waste water-treating system embodying this invention by way of indicating the principle on which said system is based.

(1) Hydrogen peroxide is added intermittently in small predetermined amounts to an aqueous solution being treated. Measurement is made of the stable potential of said aqueous solution a certain length of time after addition of hydrogen peroxide. The measured data is stored in a memory.

(2) Comparison is made between every two successive measurements of the potential to compute a variation, for example, a difference between the preceding and succeeding measurements or a quotient arrived at by dividing the preceding measurement by the succeeding measurement.

(3) Where the measured variation tends to increase, then hydrogen peroxide continues to be added.

(4) Where the measured variation tends to decrease, then the decreased variation is compared with a preset value. If the absolute value of the variation is larger than said preset value, then addition of hydrogen peroxide is stopped.

Obviously, each charge of hydrogen peroxide should be so determined as not to result in an eventual rise in the COD value of the treated aqueous solution over the predetermined allowable level, even if one extra charge is given at the end point of the oxidation reaction of the nitrous acid radical.

Figure 3:
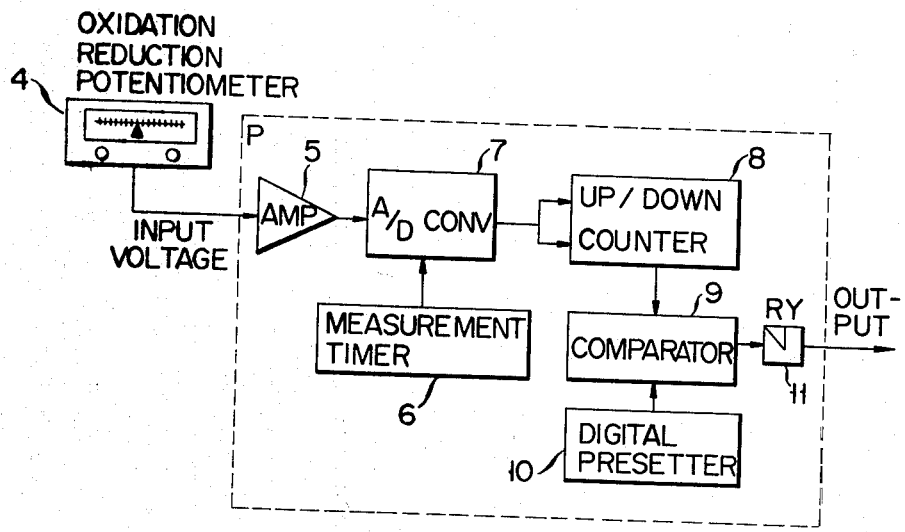
FIG. 3 is a block circuit diagram of a voltage comparator P provided with various control units used in the invention.

There will now be described by reference to the block circuit diagram of a voltage comparator shown in FIG. 3, the arrangement and operation of an automatic waste water-treating method embodying this invention.

An oxidation-reduction potential (hereinafter referred to as "the ORP") measured by an oxidation-reduction potentiometer 4 is used as an input voltage to a voltage comparator P. This input voltage is amplified by an amplifier 5. When a measurement timer 6 issues a measurement-commencing instruction, the amplified voltage signal is converted into a digital signal by an analog-digital converter (A/D CONV) 7. The magnitudes of ORP digital signals obtained at the respective adjacent points of time, for example, a and b, b and c, c and d, d and e (FIG. 2) are compared by an up-down counter 8. A signal denoting the result of said comparison is conducted to a comparator 9, where the result of said comparison is further compared with the digitally expressed voltage level preset in a digital presetter 10. Where counts made by the up-down counter 8 indicate that the value measured at the preceding point of time is higher than that measured at the succeeding point of time (for example, the value measured at the point of time d is higher than that measured at the point of time e), namely, that a variation between the values measured at two adjacent points of time indicates a decrease; and a variation, for example, a difference between the preceding and succeeding measurements or a quotient arrived at by dividing the preceding measurement by the succeeding measurement is larger than a voltage level preset in the digital presetter 10, then a relay 11 is actuated to stop the subsequent addition of hydrogen peroxide. Where the above-mentioned difference is smaller than a voltage level preset in the digital presetter 10, then the relay 11 is not energized, allowing the intermittent addition of hydrogen peroxide to be continued. The digital presetter 10 is provided to prevent the occurrence of an erroneous automatic control due to the measurement errors of the measuring instruments used for the subject waste water-treating method. Where a difference between the potential levels measured at two adjacent points of time is so small as to fall within the range of the measurement errors of the instruments (caused, for example, by electric noises and impurities deposited on an ORP electrode set in the waste water being treated), then the relay 11 would be liable to make an erroneous operation, if the digital presetter 10 were not provided. Therefore, the digital presetter 10 causes the relay 11 to be energized only when a difference between two adjacent potential levels compared by the comparator 9 is larger than the potential preset in the digital presetter 10.

The required total quantity of hydrogen peroxide may be intermittently added in the predetermined equal small amounts. To shorten a length of time required for addition of estimated total quantity of hydrogen peroxide, however, it is possible to add initially the greater portion of the total quantity of hydrogen peroxide and thereafter intermittently add the remainder in the predetermined small amounts.

With the automatic waste water-treating method of this invention, the ORP value is converted into a digital signal and the operation of the subject apparatus is controlled in accordance with the digitally expressed ORP value. The reason for this is that this arrangement can control the operation of said apparatus easily and with high precision. Obviously, the subject apparatus can be operated with the ORP value expressed in the analog form instead of converting said value into the digital form.

As described above, the system of this invention can automatically treat waste water containing a nitrous acid radical substantially to the full with the precision of treatment unaffected by the skill of individual operators, thus offering prominent industrial advantages.

This invention will be more fully understood by reference to the examples which follow.

EXAMPLE 1

Insulation rubber layer of a cable was vulcanized, using a molten salt consisting of a mixture of 7% $NaNO_3$, 40% $NaNO_2$ and 53% $KNO_3$ as a heating medium. The molten salt settled on the surface of the rubber covering was washed off with water. A sample of 1 ml was precisely weighed from waste water of 5 m$^3$ which had been repeatedly used in the above-mentioned washing and thus containing a high concentration of the molten salt. The precisely weighed sample was diluted with distilled water to 100 ml. 10% sulfuric acid was added to the diluted solution to set its pH value at 3. Titration was made by (1/40) N aqueous solution of potassium permanganate. 14.3 ml of said aqueous solution was required for titration. The result of the titration showed that the above-mentioned sample solution contained 12.7 g/l (about 12560 ppm) of sodium nitrite. It was inferred from the result of said titration that the waste water of 5 m$^3$ contained 63.3 kg of dissolved sodium nitrite, or 2860 ppm as measured on the basis of the COD value.

It was found that 31.3 kg of hydrogen peroxide in terms of 100% $H_2O_2$ was required for complete treatment of the waste water assuming that the oxidation reaction expressed by the formula (1) took place.

About 10% sulfuric acid was added while being to the 5 m$^3$ waste water to set its pH value at 3. Thereafter, commercially available 35% hydrogen peroxide solution for industrial use (where $H_2O_2$ content was chemically analyzed to be 34.99%) was slowly added, while the waste water was stirred. A sample was taken from the waste water after further stirring of two minutes. The sample was quickly titrated by an aqueous solution of (1/40) N potassium permanganate. The titration showed that the sample contained 0.022 g/l (22 ppm) of nitrous acid radical in terms of sodium nitrite. This content of a nitrous acid radical was equivalent to 5 ppm as a COD value, proving that the waste water was fully treated with hydrogen peroxide. Thereafter, the waste water was adjusted in pH value at about 7 by addition of 10% aqueous solution of sodium hydroxide and then was thrown away.

EXAMPLE 2

5 m$^3$ of the same untreated waste water as in Example 1 was put in a tank provided with a stirrer. The pH value of the waste water was set at 3 by about 10% aqueous solution of hydrochloric acid. The waste water was treated by the automatic treating system of this invention shown in FIG. 3. Commercially available 35% hydrogen peroxide solution for industrial use (whose $H_2O_2$ content was chemically analyzed to be 34.99%) was intermittently added to the waste water under the following conditions:

Amount of each charge—200 milliliters
Time used per addition—16 seconds
Time interval of intermittent addition—about 110 seconds The potential of the waste water was measured 5 seconds after the above-mentioned intermittent addition of hydrogen peroxide. The voltage of the digital presetter 10 was set at 0.05 mv. After the addition of hydrogen peroxide was automatically stopped, the same chemical analysis as in Example 1 was conducted. The chemical analysis showed that the waste water thus treated contained 0.031 g/l (31 ppm) of a nitrous acid radical in terms of sodium nitrite. This content was equivalent to 7 ppm as a COD value, proving that the waste water had been fully treated. Thereafter, the waste water was adjusted in pH value at about 7 by addition of about 10% aqueous solution of sodium hydroxide, and then was thrown away.

What we claim is:

1. A waste water-treating method, which comprises the steps of: adjusting the pH value of an aqueous solution containing a nitrous acid radical within a range of 2 to 5;

intermittently adding to a quantity of said thus adjusted aqueous solution hydrogen peroxide in an amount far smaller than that which is sufficient but not excessive for complete oxidation of the nitrous acid radical contained in said aqueous solution into a nitric acid radical;

measuring, by means of an oxidation-reduction potentiometer, the oxidation-reduction potential of the aqueous solution thus treated with hydrogen peroxide when said potential is in a stable state after each charge of hydrogen peroxide;

amplifying the measured potential by an amplifier;

when a measurement timer issues a measurement-commencing instruction after addition of the respective amounts of hydrogen peroxide, converting the measured amplified voltage into a digital signal by an analog-digital converter;

causing the digital data to be stored in an up-down counter;

computing in said up-down counter a variation between the digitally expressed oxidation-reduction potentials measured at the respective adjacent points of time;

comparing by means of a comparator a variation between the oxidation-reduction potentials measured at the respective adjacent points of time which indicates a decrease in said potential with a predetermined amount preset in a digital presetter;

stopping the addition of hydrogen peroxide when a variation between the oxidation-reduction potentials measured at the respective adjacent points of time is larger than said predetermined amount, thereby indicating a decrease in said oxidation-reduction potential; and throwing away the aqueous solution in the neutralized form.

2. The method according to claim 1 comprising energizing a relay when said oxidation-reduction potential variation is larger than said predetermined amount to stop said addition of hydrogen peroxide.

3. The method according to claim 1, wherein the aqueous solution containing a nitrous acid radical has its pH value adjusted within a range of 3 to 4.

4. The method according to claim 1, wherein the adjustment of the pH value is carried by an acid selected from the group consisting of sulfuric acid, hydrochloric acid and nitric acid.

5. The method according to claim 1, wherein the oxidation reaction of the aqueous solution containing a nitrous acid radical has an end point which is detected by said oxidation-reduction potentiometer.

* * * * *